US011182207B2

(12) United States Patent
Hirota et al.

(10) Patent No.: US 11,182,207 B2
(45) Date of Patent: Nov. 23, 2021

(54) PRE-FETCHING TASK DESCRIPTORS OF DEPENDENT TASKS

(71) Applicant: NVIDIA CORPORATION, Santa Clara, CA (US)

(72) Inventors: Gentaro Hirota, Sunnyvale, CA (US); Brian Pharris, Cary, NC (US); Jeff Tuckey, Los Gatos, CA (US); Robert Overman, Apex, NC (US); Stephen Jones, San Francisco, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 296 days.

(21) Appl. No.: 16/450,508

(22) Filed: Jun. 24, 2019

(65) Prior Publication Data
US 2020/0401444 A1 Dec. 24, 2020

(51) Int. Cl.
 *G06F 9/48* (2006.01)
 *G06F 9/52* (2006.01)

(52) U.S. Cl.
 CPC .............. *G06F 9/4881* (2013.01); *G06F 9/52* (2013.01)

(58) Field of Classification Search
 CPC .................................. G06F 9/4881; G06F 9/52
 See application file for complete search history.

(56) References Cited

U.S. PATENT DOCUMENTS

| 9,286,119 B2 | 3/2016 | Sevastiyanov et al. |
| 2003/0105942 A1* | 6/2003 | Damron ................ G06F 9/3842 712/216 |
| 2011/0004881 A1* | 1/2011 | Terechko .............. G06F 9/4881 718/102 |
| 2014/0229953 A1* | 8/2014 | Sevastiyanov ........ G06F 9/4881 718/102 |
| 2015/0067088 A1* | 3/2015 | Guerin ................ G06F 16/9014 709/213 |
| 2016/0062797 A1* | 3/2016 | Holt ...................... G06F 9/3851 718/108 |
| 2016/0357676 A1* | 12/2016 | Cain, III ............... G06F 9/4887 |

* cited by examiner

*Primary Examiner* — Benjamin C Wu
(74) *Attorney, Agent, or Firm* — Artegis Law Group, LLP

(57) ABSTRACT

Techniques are disclosed for reducing the latency between the completion of a producer task and the launch of a consumer task dependent on the producer task. Such latency exists when the information needed to launch the consumer task is unavailable when the producer task completes. Thus, various techniques are disclosed, where a task management unit initiates the retrieval of the information needed to launch the consumer task from memory in parallel with the producer task being launched. Because the retrieval of such information is initiated in parallel with the launch of the producer task, the information is often available when the producer task completes, thus allowing for the consumer task to be launched without delay. The disclosed techniques, therefore, enable the latency between completing the producer task and launching the consumer task to be reduced.

18 Claims, 8 Drawing Sheets

PRE-FETCHING TASK DESCRIPTORS OF DEPENDENT TASKS

BACKGROUND

Field of the Various Embodiments

Embodiments of the present disclosure relate generally to parallel processing systems and, more specifically, to efficiently executing workloads specified via task graphs.

Description of the Related Art

Parallel processing units (PPUs) are capable of very high processing performance using a large number of threads executing in parallel on dedicated programmable hardware processing units. Some PPUs provide an application programming interface ("API") that enable developers to specify a workload as a graph of dependencies known as a "task graph." Each node in the task graph is a task that is to be performed by one or more of the hardware processing units. Each edge in the task graph specifies a relationship between a producer task and a consumer task that is dependent on the producer task. The dependency may be a data dependency and/or an execution dependency (i.e., the producer task "happens before" the consumer task, but the consumer task does not necessarily consume any output of the producer task). A task that is dependent on multiple producer tasks is referred to as a "join task," while a task that has multiple, dependent consumer tasks is referred to as a "fork task." Typically, all of the threads executing a task must complete before any threads begin to execute any of the dependent consumer tasks.

One property of dependent task execution is that the latency between the completion of the execution of a producer task and the initiation of the execution of related consumer tasks (referred to as the "dependency resolution latency") increases the overall time required to execute the workload. Some major contributors to the dependency resolution latency between a producer task and a consumer task may be storing data generated by the producer task in a cache or memory accessible to the hardware processing units and loading data related to the consumer task from memory. In many cases, the dependency resolution latency between producer tasks and consumer tasks remains relatively constant irrespective of the time required to actually execute the tasks. Consequently, for workloads that include tasks having relatively short execution times (e.g., deep learning workloads), the dependency resolution latencies can be comparable to or even exceed the time needed to execute the tasks. As a general matter, "strong scaled" workloads exhibit increasingly short execution times as processor performance increases.

As the foregoing illustrates, what is needed in the art are more effective techniques for executing task graphs on PPUs.

SUMMARY

One embodiment of the present disclosure sets forth a computer-implemented method for executing a task graph. The method includes determining that a first task is being launched and that a second task is dependent on the first task; prior to an execution of the first task, initiating a retrieval of a task descriptor associated with the second task from a memory; and launching the second task based on the task descriptor associated with the second task subsequent to at least the execution of the first task.

At least one technical advantage of the disclosed techniques relative to the prior art is that, with the disclosed techniques, the time required to execute workloads specified via task graphs can be automatically reduced. In particular, automatically performing a descriptor prefetch, an instruction prefetch, and/or a constant data prefetch for a consumer task in parallel with activities associated with one or more related producer tasks can reduce dependency resolution latencies between the consumer task and the producer tasks. Further, automatically re-initializing a dependency tracking without any software intervention can reduce the overall time required to execute the workload. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
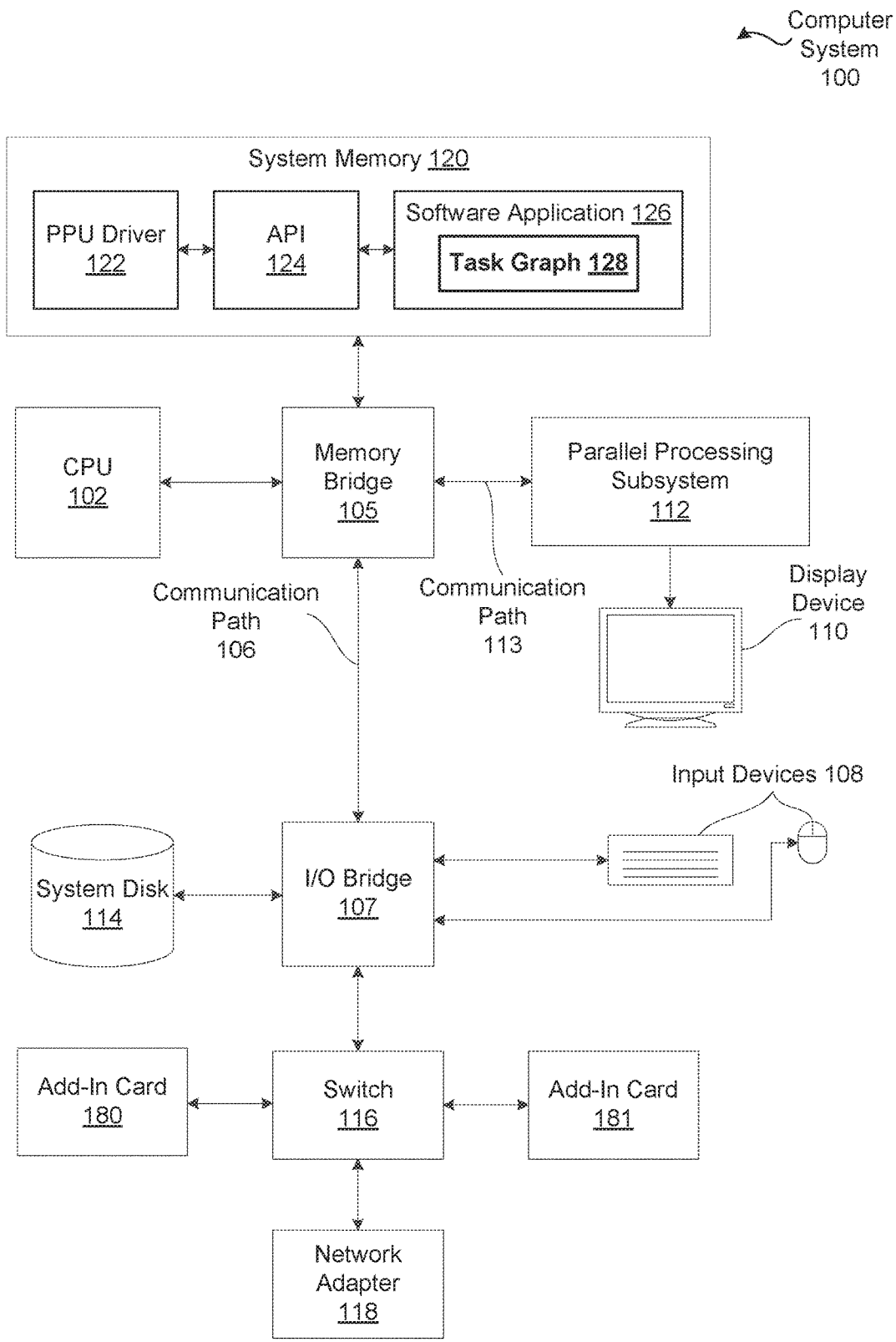
FIG. 1 is a block diagram illustrating a computer system configured to implement one or more aspects of various embodiments.

FIG. 1 is a block diagram illustrating a computer system 100 configured to implement one or more aspects of various embodiments. In some embodiments, computer system 100 is a server machine operating in a data center or a cloud computing environment that provides scalable computing resources as a service over a network.

For explanatory purposes, multiple instances of like objects are denoted with reference numbers identifying the object and parenthetical numbers identifying the instance where needed. In some embodiments, any number of the components of the computer system 100 may be distributed across multiple geographic locations or included in one or more cloud computing environments (i.e., encapsulated shared resources, software, data, etc.) in any combination.

In various embodiments, computer system 100 includes, without limitation, a central processing unit (CPU) 102 and a system memory 120 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 180 and 181.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 8 and 9, such circuitry may be incorporated across one or more parallel processing units ("PPUs"), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In other embodiments, the one or more PPUs included within parallel processing subsystem 112 may be configured to perform graphics processing, general purpose processing, and compute processing operations.

The system memory 120 includes, without limitation, a PPU driver 122, an application programming interface (API) 124, and a software application 126. As shown, the software application 126 includes, without limitation, a task graph 128. The task graph 128 specifies a workload via a graph (e.g., a directed graph) that is to be executed by at least one of the PPUs. Each node in the task graph is a task, and each edge in the task graph specifies a relationship between a producer task and a consumer task that is dependent on the producer task. A task is a set of program instructions that may be loaded into any type of memory of cache. A consumer task may have an execution and/or data dependency on a related producer task. A task that is dependent on multiple producer tasks is referred to as a "join task," while a task that has multiple, dependent consumer tasks is referred to as a "fork task." Typically, all of the threads executing a task must complete before any threads begin to execute any of the related consumer tasks. The task graph 128 is described in greater detail in conjunction with FIGS. 5-7B.

The software application 126 generates calls to the API 124 in order to specify tasks and task graphs 128. The API 124 functionality is typically implemented within the PPU driver 122. The PPU driver 122 is configured to manage the processing operations of the one or more PPUs within parallel processing subsystem 112. In alternate embodiments, the system memory 120 may include any number of drivers and each of the API 124 and the software application 126 in any combination.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 120 could be connected to CPU 102 directly rather than through memory bridge 105, and other devices would communicate with system memory 120 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
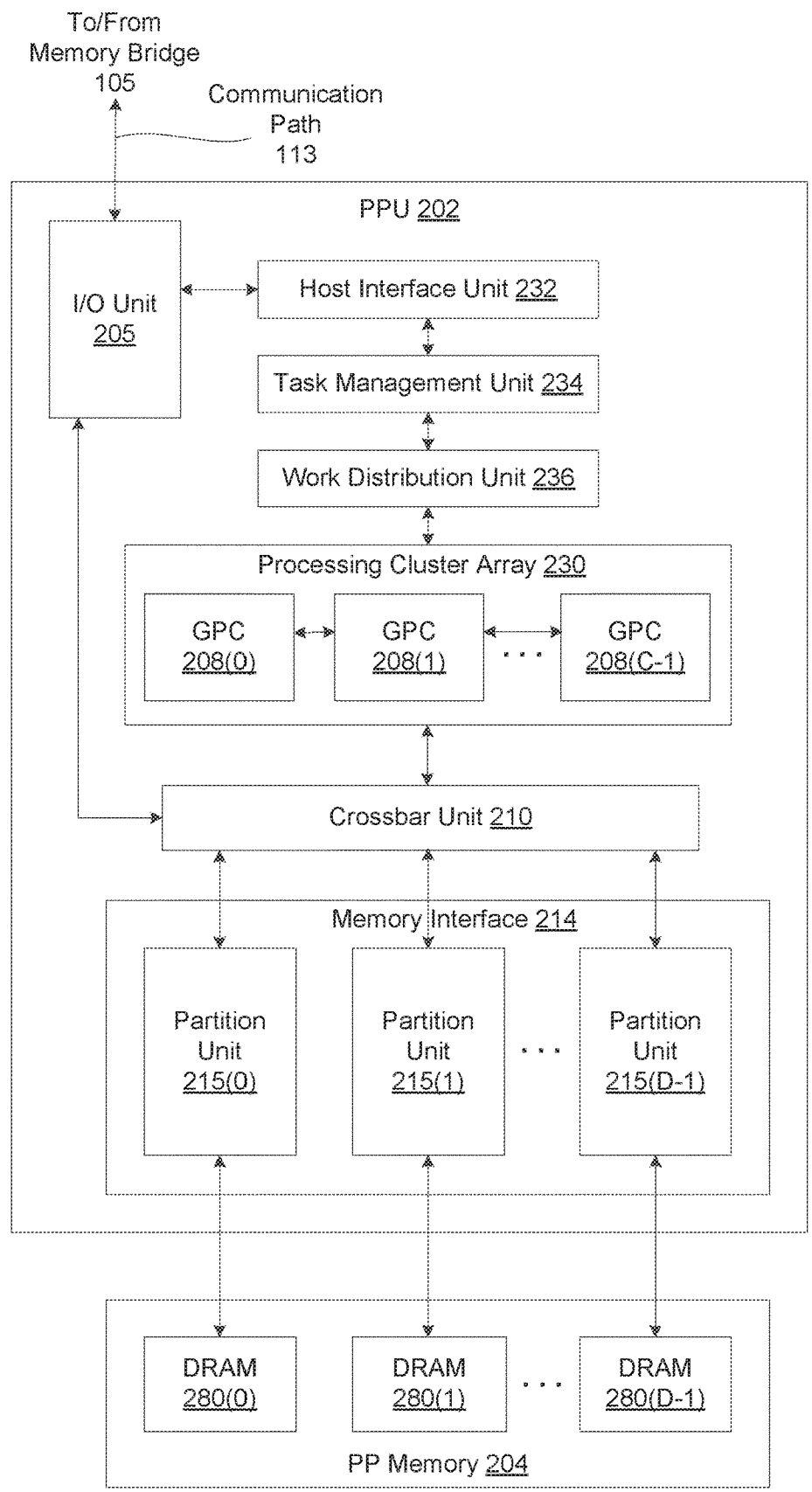
FIG. 2 is a block diagram of a parallel processing unit ("PPU") included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 120. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 120, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by the software application 126 via the PPU driver 122 to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface unit 232, while commands related to memory operations (e.g., reading from or writing to the PP memory 204) may be directed to a crossbar unit 210. In one embodiment, the host interface unit 232 reads each command queue and transmits the command stream stored in the command queue to a task management unit 234.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In some embodiments, the task management unit 234 transmits processing tasks received from the host interface unit 232 to a work distribution unit 236. In one embodiment, the work distribution unit 236 receives pointers to processing tasks that are encoded as task descriptors (not shown in FIG. 2) and stored in memory. The pointers to the task descriptors are included in a command stream that is stored as a command queue and received by the task management unit 234 from the host interface unit 232. Processing tasks that may be encoded as task descriptors include indices associated with the data to be processed as well as state parameters and commands that define how the data is to be processed. For example, the state parameters and commands could define the program to be executed on the data. Also, for example, the task descriptor could specify the number and configuration of the set of CTAs. Generally, each task descriptor corresponds to one task. The task management unit 234 receives tasks from the host interface unit 232 and ensures that the GPCs 208 are configured to a valid state before the processing task specified by each one of the task descriptors is initiated. A priority may be specified for each task descriptor that is used to schedule the execution of the processing task. Processing tasks also may be received from the processing cluster array 230. Optionally, the task descriptor may include a parameter that controls whether the task descriptor is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 120 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 120 and/or PP memory 204 to one or more on-chip memory units, process the data, and write result data back to system memory 120 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
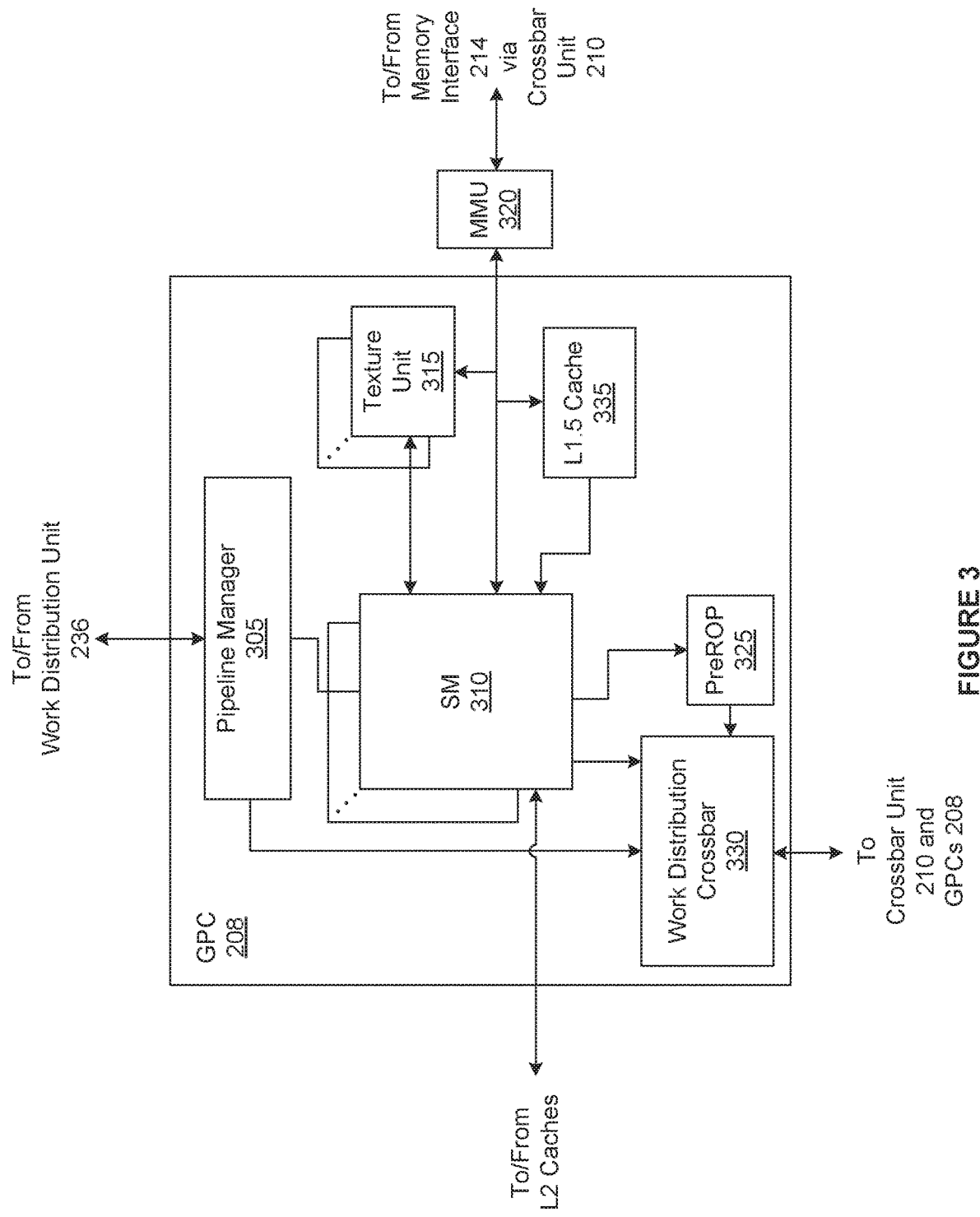
FIG. 3 is a block diagram of a general processing cluster ("GPC") included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from the work distribution unit 236 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 1OR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 310 includes multiple processing cores. In one embodiment, the SM 310 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 54 single-precision (32-bit) floating point cores, 54 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 54 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 310 provide a computing platform capable of delivering performance required for deep neural network-based artificial intelligence and machine learning applications.

In various embodiments, each SM 310 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 310 also comprises multiple load/store units (LSUs) that implement load and store operations between the shared memory/L1 cache and register files internal to the SM 310.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 120. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 120 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more of the software applications 126.

Task Management Unit

Figure 4:
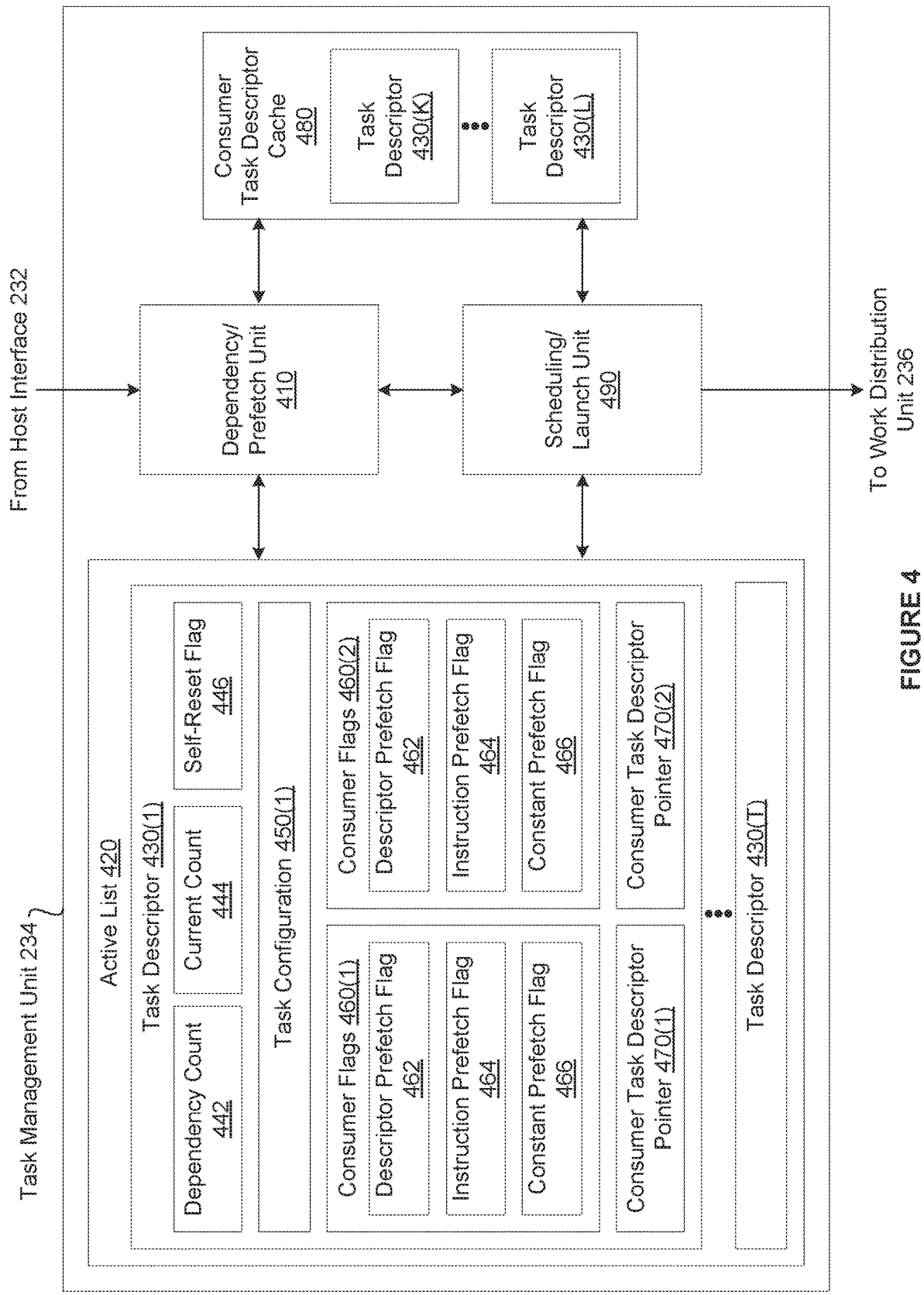
FIG. 4 is a more detailed illustration of the task management unit of FIG. 3, according to various embodiments.

FIG. 4 is a more detailed illustration of the task management unit 234 of FIG. 3, according to various embodiments. The task management unit 234 receives tasks from the host interface unit 232, the work distribution unit 236, and/or the SMs 310 and schedules the tasks for execution by the SMs 310. For explanatory purposes only, FIG. 4 describes the functionality of the task management unit 234 in the context of executing tasks specified via task descriptors 430 included in the task graph 128. It is to be understood that the task management unit 234 may receive and process any number and type of other tasks in addition to tasks included in the task graph 128. Further, the task management unit 234 may process other tasks via associated task descriptors 430 or any other type of task metadata in any technically feasible fashion.

The task graph 128 specifies a workload as a directed graph. The nodes of the graph specify tasks, and the edges between the nodes specify dependency relationships between "producer tasks" and "consumer tasks." Each dependency relationship may be a data dependency and/or an execution dependency (i.e., the producer task "happens before" the consumer task, but the consumer task does not necessarily consume any output of the producer task). In various embodiments, a given task may be a producer task of one or more tasks and a consumer task of one or more other tasks. For example, if task B depends on task A and task C depends on task B, then task B is a consumer task of task A and a producer task of task C.

A task having multiple consumer tasks is referred to herein as a "fork task," and a task having multiple producer tasks is referred to herein as a "join task." Note that a single task can be both a fork task and a join task. Importantly, all of the threads executing a task must complete before any of the related consumer tasks can be executed. Further, before any thread begins to execute a task, the execution of all of the related producer tasks must complete.

One drawback of conventional task management units is that dependency resolution latencies between the completion of producer tasks and the initiation of related consumer tasks increases the overall time required to execute the workload. For explanatory purposes only, the dependency resolution latency between the completion of a producer task and the initiation of a consumer task is also referred to herein as the dependency resolution latency between the producer task and the consumer task. Some major contributors to the dependency resolution latency between a producer task and a consumer task include, without limitation, ensuring that data generated by the producer task is stored in a shared cache or memory accessible to all the streaming multiprocessors that can be assigned tasks included in the task graph, reading a description of the consumer task from memory, reading instructions associated with the consumer task from memory, and reading constants associated with the consumer task from memory.

Further, in some embodiments, a task graph can also specify one or more loops of tasks that are conditionally repeated. For these types of task graphs, the overall performance of a conventional task management unit is also degraded by overhead associated with how the conventional task management unit tracks the dependencies for tasks that are included in loops. In one approach to tracking the dependencies, each task is associated with a current count that is initialized by a software application to the total number of related producer tasks (e.g., 2). When a producer task of a consumer task completes, a conventional task management unit decrements the current count associated with the consumer task. When the current count of a task reaches zero, the conventional task management unit launches the task. If the task is included in a loop, then the software application is required to re-initialize the current count before the next iteration of the loop. Because interactions between a software application and a PPU are usually time-consuming, the overhead associated with re-initializing the current counts can significantly increase the overall time required to execute a complex task graph.

To reduce the overall time required to execute the workload specified via the task graph 128, a dependency/prefetch unit 410 included in the task management unit 234 implements prefetch and self-reset functionality. The prefetch functionality caches any number of the task descriptor 430, instructions, and constants of a consumer task at a time when the associated memory load is likely to be subsumed by activities associated with a producer task. For each consumer task of a producer task, the task descriptor 430 of the producer task specifies whether prefetch functionality is enabled for each of the task descriptor 430, instructions, and constants of the consumer task. When the dependency/prefetch unit 410 reads the task descriptor 430, the enabled prefetch functionality is triggered. When triggered, the prefetch functionality reduces the resolution dependency latency between the producer task and the consumer task.

The self-reset functionality is automatically triggered for a task by the task descriptor 430 of the task. The self-reset functionality re-initializes the dependency tracking for a task sometime after the task completes and before any related consumer tasks complete. The task descriptor 430 of a task specifies whether the self-reset functionality is enabled for the task. When the dependency/prefetch unit 410 read a task descriptor 430 specifying that the self-reset functionality is enabled, the self-reset functionality is triggered for the associated task. When triggered, the self-reset functionality reduces the number of dependency initialization command (s) that the software application 126 issues.

Although not shown in FIG. 4, the task graph 128 includes, without limitation, any number of the task descriptors 430. Each of the task descriptors 430 is a data record that describes a different task that is to be performed by one or more threads executing on the SMs 310. Each of the task descriptors 430 includes, without limitation, a task configuration 450, consumer task descriptor pointers 470(1)-470(2), consumer flags 460(1)-460(2), a dependency count 442, a current count 444, and a self-reset flag 426.

The task configuration 450 includes, without limitation, any amount and type of data used to configure components of the PPU 202 (e.g., the processing cluster array 230, the GPCs 208, the SMs 310, etc.) to perform the associated task. For instance, in some embodiments, the task configuration 450 includes, without limitation, a CTA program start address, grid dimensions in terms of CTAs, CTA dimension in terms of threads, register and shared memory requirements, etc.

For explanatory purposes only, the task descriptor 430 that describes a task A is also referred to herein as "the task descriptor 430 of task A." Further, the consumer task B of task A is also referred to herein as a consumer task of the task descriptor 430 of task A. Similarly, a producer task A of task B is also referred to herein as a producer task of the task descriptor 430 of task B.

Each of the consumer task descriptor pointers 470 included in a task descriptor 430 of a given task is a pointer to a different task descriptor 430 of a consumer task related to the given task. Note that any number of the consumer task descriptor pointers 470 may be NULL and, therefore, each of the tasks associated with the task graph 128 may have zero, one, or two consumer tasks. In alternate embodiments, each of the task descriptors 430 may include N task descriptors pointers 470 and N consumer flags 460, where N may be any positive integer. In such embodiments, each of the tasks may have between zero and N consumer tasks, inclusive.

The consumer flags 460($v$) are associated with the consumer task descriptor pointer 470($v$) and the associated consumer task. As shown, each of the consumer flags 460 includes, without limitation, a descriptor prefetch flag 462, an instruction prefetch flag 464, and a constant prefetch flag 466. When true, each of the consumer flags 460 triggers the dependency/prefetch unit 410 to perform prefetch operations for the associated consumer task. The prefetch operations reduce the dependency resolution latency between the producer task and the consumer task.

The dependency count 442 specifies the number of dependencies that the task associated with the task descriptor 430 has on producer tasks. The dependency count 442 for a join task is therefore at least two. By contrast, if the dependency count 422 for a task is one, then the task is dependent upon one other task. The current count 444 specifies the number of dependencies of the task that have not yet been met. The self-reset flag 446 triggers the dependency/prefetch unit 410 to automatically copy the dependency count 442 to the current count 444 when the task-related activities for the task have completed. As referred to herein, task-related activities for a task include, without limitation, any amount and type of operations associated with preparing a task for launch, scheduling a task, launching the task, executing the task, ensuring that the data generated by the task is available to all the SMs 310, and updating the task descriptor 430 for the task.

Prior to initiating the execution of the workload described by the task graph 128, for each of the tasks, the software application 126 sends a dependency initialization command to the PPU 202. The dependency initialization command is relayed to the task management unit 234 and, in response, the dependency/prefetch unit 410 copies the dependency count 442 to the current count 444 to indicate that none of the dependencies of the task are met.

To initiate the execution of the workload specified by the task graph 128, the software application 126 transmits a pointer to the task descriptor 430(1) that is the root of the task graph 128 to the PPU 202. The pointer to the task descriptor 430(1) is relayed to the task management unit 234. Upon receiving the pointer to the task descriptor 430(1) of the root task, the dependency/prefetch unit 410 determines that the current count 444(1) is zero and, consequently, the dependencies for the root task are met.

Upon determining that the dependencies for a task X included in the task graph 128 are met, the dependency/prefetch unit 410 obtains the task descriptor 430(x) of task X via a pointer. The dependency/prefetch unit 410 then adds the task description 430(x) to the active list 420. If task X is the root task, then the pointer is transmitted to the task management unit 234. If task X is a consumer task, then the pointer is the consumer task descriptor pointer 470 associated with task X and included in a related producer task descriptor 430. As described in greater detail below, as the result of a previously-executed task descriptor prefetch, the task descriptor 430(x) may be cached in the consumer task descriptor cache 480.

If the task descriptor 430(x) is not cached in the consumer task descriptor cache 480, then the dependency/prefetch unit 410 performs a task descriptor fetch to obtain the task descriptor 430(x). The task descriptor fetch de-references the pointer to the task, thereby obtaining the task descriptor 430(x) from a memory that is external to the task management unit 234 (e.g., the PP memory 202, the system memory 120, etc.). Because of the associated memory load, the task descriptor fetch is typically relatively time-consuming and, consequently, a significant contributor to the dependency resolution latency that delays the execution of task X.

If, however, the task descriptor 430(x) is cached in the consumer task descriptor cache 480, then the dependency/prefetch unit 410 obtains the cached task descriptor 430(x) from the consumer task descriptor cache 480. Because the dependency/prefetch unit 410 does not perform a task descriptor fetch for task X, the execution of task X is not delayed by the memory load associated with the task descriptor fetch.

As shown, the active list 420 includes, without limitation, any number of task descriptors 430 for which the dependencies are met. In alternate embodiments, the active list 420 may be implemented in conjunction with any number of caches that are associated with the PPU 202 at any level of granularity. Further, the dependency/prefetch unit 410 may add the task descriptor 430(x) to the active list 420 in any technically feasible fashion. For instance, in some embodiments, to add the task descriptor 430(x) to the active list 420, the dependency/prefetch unit 410 may cache any portion of the task descriptor 430(x) across any number and type of caches and then indicate to the scheduling/launch unit 490 that the task descriptor 430(x) is active.

After the dependency/prefetch unit 410 adds the task descriptor 430(x) to the active list 420, the scheduling/launch unit 490 initiates a task launch of task X as per the task descriptor 430(x). The task launch of task X is a setup activity that precedes the execution of task X. The task launch may involve, without limitation, any number of operations (e.g., CTA launch, warp launch, etc.) that prepare any number of the SMs 310 to participate in the task execution of task X. When the scheduling/launch unit 490 initiates the task launch, the dependency/prefetch unit 410 determines whether to prefetch any of the consumer task descriptors 430 of task X based on the consumer flags 460 included in the task descriptor 430(x).

For each of the consumer task descriptor pointers 470(y) included in the task descriptor 430(x), if the associated descriptor prefetch flag 462 is true, then the dependency/prefetch unit 410 initiates a task descriptor prefetch based on the consumer task descriptor pointer 470(y). The task descriptor prefetch de-references the consumer task descriptor pointer 470(y) and adds the resulting task descriptor 430 to the consumer task descriptor cache 480. Advantageously, at least a portion of at least one of the task descriptor prefetches occurs in parallel with at least a portion of the task launch of task X.

The consumer task descriptor cache 480 has a limited size and can only store a finite number of the task descriptors 430 at any given time. The timing of the task descriptor prefetch represents an informed tradeoff between minimizing the lifetime of the task descriptor 430 of the consumer task in the consumer task descriptor cache 480 and minimizing the dependency resolution latency. In various embodiments, the task descriptor prefetch for a consumer task completes before the completion of the task execution of the producer task. As a result, the memory load associated with the task descriptor prefetch does not contribute to the dependency resolution latency between the producer task and the consumer task.

In some embodiments, the dependency/prefetch unit 410, the API 124, and/or the PPU driver 122 implement additional functionality that enables the software application 126 to issue a "task descriptor prefetch command" for a specified task. The task descriptor prefetch command causes the dependency/prefetch unit 410 to execute a task descriptor prefetch for the specified task. Advantageously, the task descriptor prefetch command enables the software application 126 to perform optimization operations that are fine-tuned for the workload. For example, if a CTA program of a producer task directly launches a consumer task, then the CTA program can issue the task descriptor prefetch command for the consumer task prior to launching the consumer task.

After the task launch of task X completes, the scheduling/launch unit 490 ensures that instructions for task X are cached. As described in greater detail below, instructions for task X may be cached in an instruction cache (or an instruction/constant cache) as the result of a previously-executed instruction prefetch. If instructions for task X are not cached, then the scheduling/launch unit 490 executes an instruction fetch that copies instructions for task X to an instruction/constant cache or an instruction cache.

After the scheduling/launch unit 490 ensures that instructions for task X are cached, the scheduling/launch unit 490 ensures that constants for task X are cached. As described in greater detail below, the constants for task X may be cached in an instruction/constant or a constant cache as the result of a previously-executed constant prefetch. If the constants for task X are not cached, then the scheduling/launch unit 490 executes a constant fetch that copies constants for task X to an instruction/constant cache or a constant cache.

As persons skilled in the art will recognize, the instruction fetch and the constant fetch read data from a memory that is external to the task management unit 234 (e.g., the PP memory 202, the system memory 120, etc.). Because of the associated memory load, each instruction fetch and constant fetch is typically relatively time-consuming and, consequently, a significant contributor to the dependency resolution latency that delays the execution of task X.

By contrast, when instructions for task X are cached as the result of a previously-executed instruction prefetch, the scheduling/launch unit 490 does not perform the instruction fetch for task X. Accordingly, the execution of task X is not delayed by the memory load associated with the instruction fetch. Similarly, when constants for task X are cached as the result of a previously-executed constant prefetch, the scheduling/launch unit 490 does not perform the constant fetch for task X. Consequently, the execution of task X is not delayed by the memory load associated with the constant fetch.

After the scheduling/launch unit 490 ensures that constants for task X are cached, the scheduling/launch unit 490 initiates a task execution of task X. During the task execution of task X, each of any number of SMs 310 executes one or more threads of task X. As referred to herein, the task execution of a task is the time during which at least one of the SMs 310 is executing at least one thread of the task. When the task execution of task X completes, the dependency/prefetch unit 410 performs any number (including zero) of instruction prefetches and/or constant prefetches while the SMs 310 that executed task X perform a memory flush for task X. Note that any number of instruction prefetches and any number of constant prefetches for any number of consumer tasks may occur at least partially in parallel to each other and to the memory flush for task X.

For each instruction prefetch flag 464 included in the task descriptor 430(x) that is true, the dependency/prefetch unit 410 initiates an instruction prefetch for the associated consumer task. The instruction prefetch for a consumer task stores instructions for the consumer task in an instruction/constant cache or an instruction cache. Similarly, for each constant prefetch flag 466 included in the task descriptor 430(x) that is true, the dependency/prefetch unit 410 initiates a constant prefetch for the associated consumer task, The constant prefetch for a consumer task stores constants associated with the consumer task in an instruction/constant cache or a constant cache.

Advantageously, the instruction prefetch and the constant prefetch are timed to avoid cache thrashing while maximizing the resulting reduction in dependency resolution latency. More precisely, the instruction cache and the constant cache (or the instruction/constant cache) are used by task X. For this reason, performing an instruction prefetch or a constant prefetch for a related consumer task before the completion of the task execution of task X would likely cause cache trashing. Further, the memory flush for task X and subsequent task-related activities for task X typically subsume the overhead of any instruction prefetches and any constant prefetches for related consumer tasks. As a result, the instruction prefetches and the constant prefetches do not contribute to the dependency resolution latencies between task X and the related consumer tasks.

The memory flush for task X ensures that any data produced by task X is stored in memory that is accessible by all the SMs 310 that can be assigned tasks included in the task graph 128. The memory flush for task X may be performed by any unit or combination of units in any technically feasible fashion. For instance, in some embodiments, each of the SMs 310 that participated in the task execution of task X transmits data stored in an associated L1 cache to the work distribution crossbar 330 in order to store the data in an L2 cache.

After the memory flush for task X is complete, the dependency/prefetch unit 410 executes a count update for task X. For each consumer task descriptor 430 associated with task X, the dependency/prefetch unit 410 decrements the current count 444. If, after decrementing the current count 444 of the task descriptor 430(y), the current count 444 is zero, then the dependency/prefetch unit 410 adds the task descriptor 430(y) to the active list 420.

In addition, if the self-reset flag 446 included in the task descriptor 430(x) of task X is true, then the dependency/prefetch unit 410 copies the dependency count 442 of the task descriptor 430(x) to the current count 444 of the task descriptor 430(x). Advantageously, if task X is a task included in a conditional loop, automatically resetting the current count 444 in this manner enables any number of re-executions of task X. As a result, the overall time required to execute the workload specified via the task graph 128 can be reduced relative to prior-art approaches that would require the software application 126 to re-issue the dependency initialization command for task X to enable each re-execution of task X.

In some embodiments, as part of the count update for task X, any number and type of conditional branch/iteration commands may be evaluated in any technically feasible fashion by software, hardware, or any combination thereof. For example, after the sequential execution of tasks A, B, and C, a convergence condition associated with task C could be evaluated. If the convergence condition was not met, then the dependency/prefetch unit could re-add the task descriptor 430 of task A to the active list 420. In this fashion, the loop of tasks A, B, and C could be repeatedly re-executed until the convergence condition was met.

In some embodiments, the dependency/prefetch unit 410, the API 124, and/or the PPU driver 122 implement additional functionality that enables the software application 126 to issue a "decrement dependency" command for a specified task. The decrement dependency command causes the dependency/prefetch unit 410 to decrement the current count 444 included in the task descriptor 430 of the specified task. If, after modifying the current count 444 of the task descriptor 430, the current count 444 is zero, then the dependency/prefetch unit 410 adds the task descriptor 430 to the active list 420.

The decrement dependency command enables the task graph 128 to include tasks that are dependent on producer tasks and/or events that are external to the task graph 128. For example, a task "D" could be dependent on a producer task "A" specified in the task graph 128, a signal "K" arriving from the CPU 102, and a packet "V" arriving on a network. The dependency count 442 would, therefore, be 3. The software application 126 would issue one decrement dependency command when signal K arrived and another decrement dependency command when packet V arrived.

After executing the count update for task X, the dependency/prefetch unit 410 removes the task descriptor 430(x) from the active list 420. In alternate embodiments, any of the dependency/prefetch unit 410, the scheduling/launch unit 490, and the work distribution unit 236 in any combination may perform any number and type of operations to remove the task descriptor 430(x) from the active list 420. Further, the task descriptor 430(x) may be removed from the active list 420 at any time after memory flush for task X.

Note that the techniques described herein are illustrative rather than restrictive, and may be altered without departing from the broader spirit and scope of the disclosure. Many modifications and variations will be apparent to those of ordinary skill in the art without departing from the scope and spirit of the described embodiments and techniques.

For instance, in some embodiments, the current count 444 is not used unless the associated task is a join task. If the dependency count 442 included in the task descriptor 430(y) of a consumer task is less than two, then the dependency/prefetch unit 410 automatically adds the task description 430(y) to the active list 420 when performing the count update for the associated producer task. As a result, initializing and re-initializing the current count 444 for the root task and tasks with less than two dependencies is not necessary.

In the same or other embodiments, any number of the host interface unit 232, the task management unit 234, the dependency prefetch unit 410, the scheduling/launch unit 490, and the work/distribution unit 236 in any combination may implement the prefetch and self-reset functionality described herein.

Reducing Dependency Resolution Latencies

Figure 5:
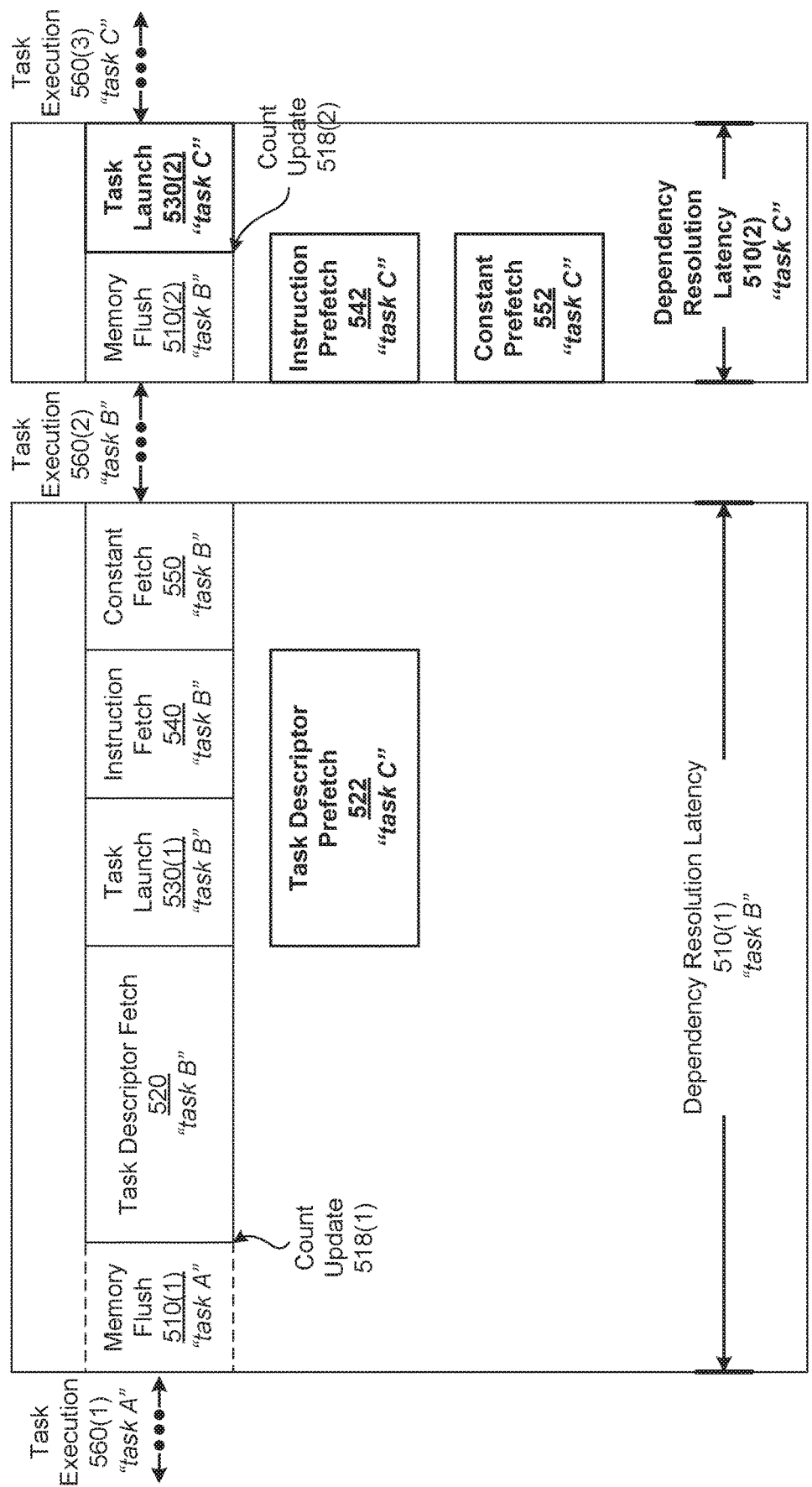
FIG. 5 is an example illustration of dependency resolution latencies associated with the task graph of FIG. 1, according to various embodiments.

FIG. 5 is an example illustration of dependency resolution latencies 510 associated with the task graph 128 of FIG. 1, according to various embodiments. More precisely, FIG. 5 illustrates task-related activities that contribute to the dependency resolution latency 510(1) between a task A and a task B, and the dependency resolution latency 510(2) between task B and a task C. For explanatory purposes only, operations associated with other tasks specified via the task graph 128 are not depicted in FIG. 5.

The consumer task descriptor pointer 470(1) included in the task descriptor 430(1) of task A specifies (e.g., points to) the task descriptor 430(2) of task B. The associated consumer flags 460(1) specify that no prefetches are to be performed for task B. More precisely, each of the descriptor prefetch flag 462, the instruction prefetch flag 464, and the constant prefetch flag 466 included in the consumer flags 460(1) are false (or zero). The self-reset flag 446 included in the task descriptor 430(1) of task A is true (or one).

The consumer task descriptor pointer 470(1) included in the task descriptor 430(2) of task B specifies the task descriptor 430(3) of task C. And each of the descriptor prefetch flag 462, the instruction prefetch flag 464, and the constant prefetch flag 466 included in the associated consumer flags 460(1) are equal to "true" or one. Consequently, the dependency/prefetch unit 410 automatically performs a task descriptor prefetch 522, an instruction prefetch 542, and a constant prefetch for task C. The dependency count 442, the current count 444 and the self-reset flag 446 included in the task descriptor 430(2) of task B are, respectively, one, one and true (or one).

As shown, after the completion of the task execution 560(1) of task A, the SMs 310 that participated in the task execution 530(1) perform a memory flush 510(1) for task A. After the completion of the memory flush 510(1) for task A, the dependency/prefetch unit 410 executes a count update 518(1) for task A. As part of the count update 518(1) for task A, the dependency/prefetch unit 410 decrements the current count 444 associated with task B. Because the self-reset flag 446 included in the task descriptor 430(1) of task A is true, the dependency/prefetch unit 410 copies the dependency count 442 included in the task descriptor 430(1) to the current count 444 included in the task descriptor 430(1). The dependency/prefetch unit 410 then removes the task descriptor 430(1) of task A from the active list 420.

Because the current count 444 included in the task descriptor 430(2) of task B is now zero and the task descriptor 430(2) is not cached in the consumer task descriptor cache 480, the dependency/prefetch unit 410 performs a task descriptor fetch 520 for task B. The dependency/prefetch unit 410 adds the resulting task descriptor 430(2) to the active list 420.

After the completion of the task descriptor fetch 520 for task B, the scheduling/launch unit 490 initiates a task launch 530 of task B and, in parallel, the dependency/prefetch unit 410 initiates the task descriptor prefetch 522 for task C. After the completion of the task launch 530 of task B, the scheduling/launch unit 490 determines that instructions for task B are not cached and executes an instruction fetch 540 that caches the instructions for task B. After the completion of the instruction fetch 540, the scheduling/launch unit 490 determines that constants for task B are not cached and executes a constant fetch 550 that caches the constants for task B. After the completion of the constant fetch 550, the scheduling/launch unit 490 initiates the task execution 560 (2) of task B.

After the completion of the task execution 560(2) of task B, the SMs 310 that participated in the task execution 560(2) perform the memory flush 510(2) for task B and the dependency/prefetch unit 410 executes the instruction prefetch 542 for task C and the constant prefetch 552 for task C. As shown, the memory flush 510(2) for task B, the instruction prefetch 542 for task C, and the constant prefetch 552 for task C occur in parallel.

After the completion of the consumer memory update 510(2), the dependency/prefetch unit 410 executes the count update 518(2) for task B. As part of the count update 518(2) for task B, the dependency/prefetch unit 410 decrements the current count 444 associated with task C. Because the self-reset flag 446 included in the task descriptor 430(2) of task B is true, the dependency/prefetch unit 410 copies the dependency count 442 included in the task descriptor 430(2) to the current count 444 included in the task descriptor 430(2). The dependency/prefetch unit 410 then removes the task descriptor 430(2) of task B from the active list 420.

Subsequently, the dependency/prefetch unit 410 determines that the current count 444 associated with task C is zero. Advantageously, the task descriptor 430(3) of task C is cached in the consumer task descriptor cache 480. Consequently, the dependency/prefetch unit 410 adds the cached task descriptor 430(3) to the active list 420 without performing the task descriptor fetch 520 for task C. The scheduling/launch unit 490 then initiates a task launch 530(2) of task C without unnecessary delay. After the task launch 530 completes, because the instructions and the constants for task C are cached, the scheduling/launch unit 490 initiates the task execution 530(3) of task C without unnecessary delay.

As shown, the dependency resolution latency 510(1) for task B is the time between the completion of the task execution 530(1) of task A and the start of the task execution 530(2) of task B. Because the task management unit 234 performs no prefetches for task B, the dependency resolution latency 510(1) includes, without limitation, the time required to perform the memory flush 510(1), the task descriptor fetch 520, the task launch 530, the instruction fetch 540, and the constant fetch 550.

The dependency resolution latency 510(2) for task C is the time between the completion of the task execution 530(2) of task B and the start of the task execution 530(3) of task C begins. Because the task management unit 234 performs prefetches for each of the task descriptor 430(3) of task C, instructions for task C, and constants for task C, the dependency resolution latency 510(2) includes, without limitation, the time required to perform the memory flush 510(1) and the task launch 530.

As FIG. 5 illustrates, by performing prefetches in parallel to other task-related activities, the task management unit 234 substantially reduces the dependency resolution latencies 510 associated with the task graph 128. For example, in some PPUs 202, perform prefetches can reduce each dependency resolution latency 510 by more than half.

Figure 6:
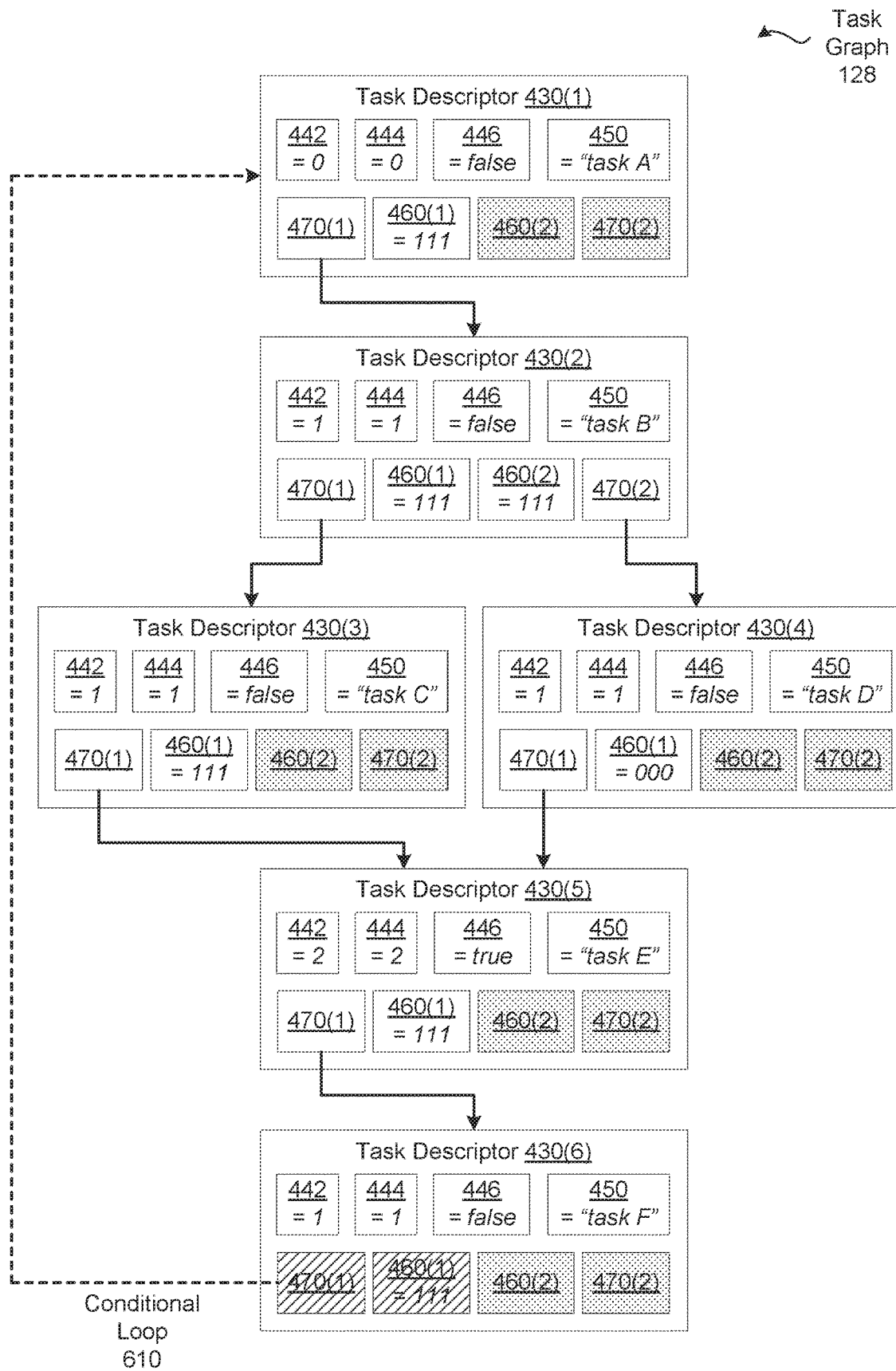
FIG. 6 is an exemplary illustration of the task graph of FIG. 1, according to various embodiments.

FIG. 6 is an exemplary illustration of the task graph 128 of FIG. 1, according to various embodiments. As shown, the task graph 128 includes, without limitation, the task descriptors 430(1)-430(6), six dependency relationships (depicted as arrows), and a conditional loop 610 (depicted via a dashed line). For explanatory purposes only, exemplary values for relevant fields of the task descriptors 430 are depicted in italics. Further, fields of the task descriptors 430 that are NULL or irrelevant are depicted with a dotted fill pattern and fields of the task descriptors 430 that are associated with the conditional loop 610 are depicted with a diagonal fill pattern.

The task descriptor 430(1) is associated with a task A, the task descriptor 430(2) is associated with a task B, the task descriptor 430(3) is associated with a task C, the task descriptor 430(4) is associated with a task D, the task descriptor 430(5) is associated with a task E, and the task descriptor 430(6) is associated with a task F. Task A has a single consumer task, task B. Task B is dependent on task A and has two consumer tasks, task C and task D. Because task B has multiple consumer tasks, task B is a fork task. Each of task C and task D is dependent on task B and has a single consumer task, task E. Task E is dependent on both task C and task D and has a single consumer task, task F. Because task E is dependent on multiple tasks, task E is a join task and the task descriptor 430(5) of task E includes the dependency count 442 of two. Task F is dependent on task E and has a conditional branch/iteration that is depicted as the conditional loop 610. The producer task associated with the conditional loop 610 is the task F and the consumer task associated with the conditional loop 610 is the task A.

Prior to executing the workload described by the task graph 128, the software application 126 sends a dependency initialization command for each of the tasks A, B, C, D, E, and F to the PPU 202. As a result, the dependency/prefetch unit 410 sets the current count 444 in the task descriptor 430(5) of task E to two and the current count 444 included in each of the task descriptors 430(1)-430(4) and 430(6) to one. Subsequently, to execute the workload described by the task graph 128, the software application 126 transmits a pointer to the task descriptor 430(1) of task A to the PPU 202.

For the task descriptor 430(1) of task A, the associated consumer flags 460(1) are equal to "111," specifying a true value for each of the descriptor prefetch flag 462, the instruction prefetch flag 464, and the constant prefetch flag 466 associated with the consumer task B. For the task descriptor 430(2) of task B, the consumer flags 460(1) and the consumer flags 460(2) specify a true value for each of the descriptor prefetch flag 462, the instruction prefetch flag 464, and the constant prefetch flag 466 associated with, respectively, the consumer task C and the consumer task D. For the task descriptor 430(3) of task C, the consumer flags 460(1) specify a true value for each of the descriptor prefetch flag 462, the instruction prefetch flag 464, and the constant prefetch flag 466 associated with the consumer task E. Because the task descriptor 430(3) of task C activates the task descriptor prefetch 522, the instruction prefetch 542, and the constant prefetch 554 for the consumer task E, the task descriptor 430(4) of task D does not activate any prefetches for the consumer task E. More precisely, the consumer flags 460(1) included in the task descriptor 430(4) of task D are "000," specifying a false value for each of the descriptor prefetch flag 462, the instruction prefetch flag 464, and the constant prefetch flag 466 associated with the consumer task E. For the task descriptor 430(5) of task E, the consumer flags 460(1) specify a true value for each of the descriptor prefetch flag 462, the instruction prefetch flag 464, and the constant prefetch flag 466 associated with the consumer task F. For the task descriptor 430(6) of task F, the consumer flags 460(1) specify a true value for each of the descriptor prefetch flag 462, the instruction prefetch flag 464, and the constant prefetch flag 466 associated with the consumer task A.

In this fashion, the task graph 128 configures the task management unit 234 to automatically perform the task descriptor prefetch 522, the instruction prefetch 542, and the constant prefetch 552 for each of task B, task C, task D, task E, task F, and (conditionally) task A. As a result, each of the dependency resolution latency 510(1) between task A and task B, the dependency resolution latency 510(2) between task B and task C, the dependency resolution latency 510(3) between task B and task D, the dependency resolution latency 510(4) between task C and task E, the dependency resolution latency 510(5) between task D and task E, the dependency resolution latency 510(6) between task E and task F, and (conditionally) the dependency resolution latency 510(7) between task F and task A is reduced.

Further, because the self-reset flag 446 included in each of the task descriptors 430(1)-430(6) is true, the dependency/prefetch unit 410 executes the conditional loop 610 properly without software intervention. As described previously herein, if the self-reset flag 446 included in the task descriptor 430(x) for the task X is true, then the dependency/prefetch unit 510 automatically copies the dependency count 442 included in the task descriptor 430(x) to the current count 444 included in the task descriptor 430(x) as part of the count update 518 for the task X. Accordingly, the software application 126 does not need to re-send the dependency initialization command for each of the tasks A, B, C, D, E, and F to the PPU 202 before each iteration of the conditional loop 610. As a result, the overall time required to execute the workload specified via the task graph 128 is reduced.

As previously noted herein, the techniques described herein are illustrative rather than restrictive, and may be altered without departing from the broader spirit and scope of the present disclosure. Many modifications and variations will be apparent to those of ordinary skill in the art without departing from the scope and spirit of the described embodiments and techniques. For instance, in alternate embodiments, a true value for the descriptor prefetch flag 462 included in the task descriptor 430(x) may automatically cause at least a portion of the descriptor prefetch 522 for task X to occur in parallel with at least a portion of the task launch 530 of a related producer task in any technically feasible fashion. In the same or other alternate embodiments, a true value for the instruction prefetch flag 464 included in the task descriptor 430(x) may automatically cause at least a portion of the instruction prefetch 542 for task X to occur in parallel with at least a portion of the memory flush 510 of a related producer task in any technically feasible fashion. Similarly, a true value for the constant prefetch flag 466 included in the task descriptor 430(x) may automatically cause at least a portion of the constant prefetch 552 for task X to occur in parallel with at least a portion of the memory flush 510 of a related producer task in any technically feasible fashion. In various embodiments, a true value for the self-reset flag 446 included in the task descriptor 430(x) may automatically cause the re-initialization of the current count 444 included in the task descriptor 430(x) at any time between the task launch 530 of task X and the execution of the conditional loop 610 in any technically feasible fashion.

Figure 7A:
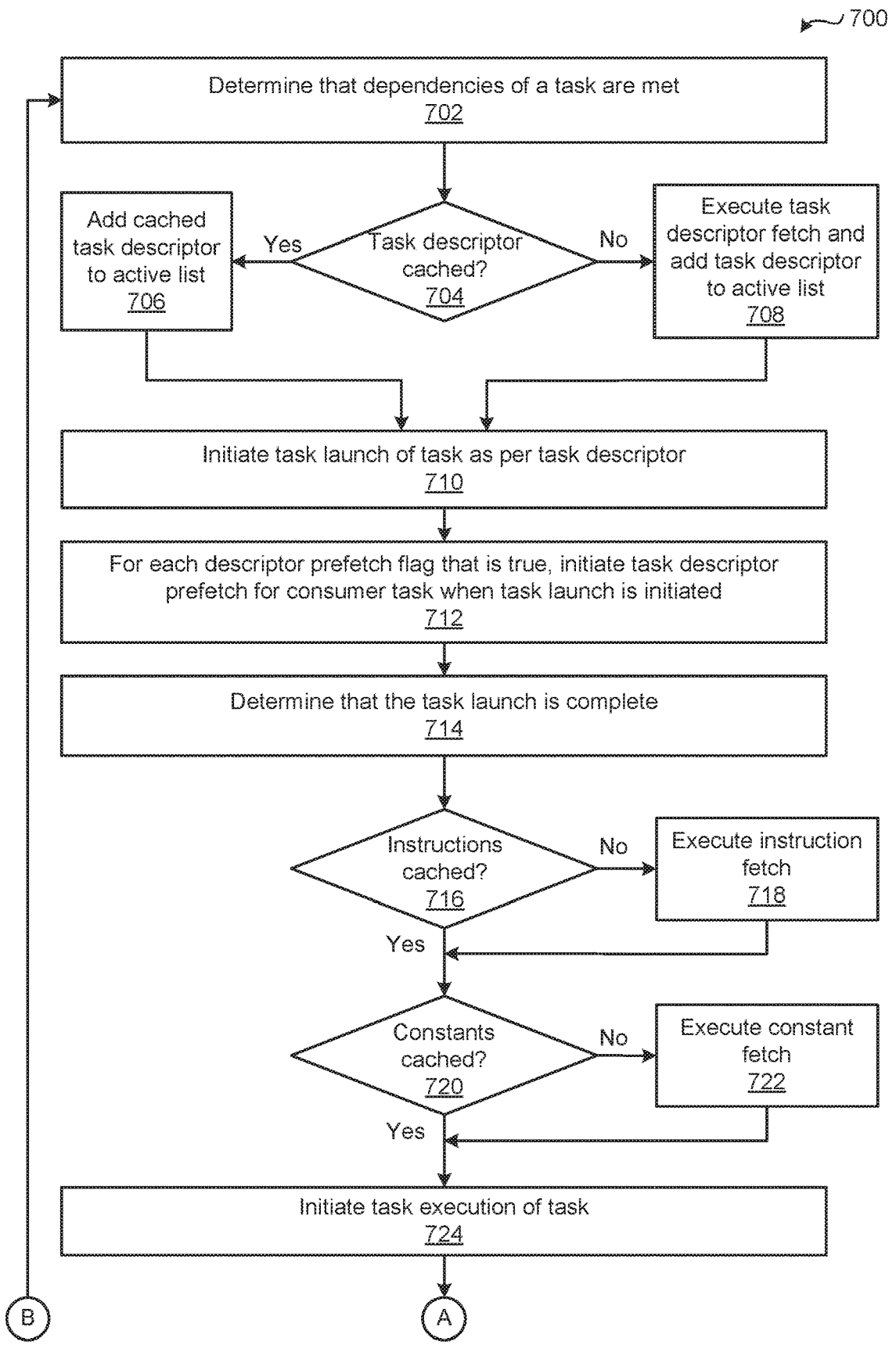
FIGS. 7A-7B set forth a flow diagram of method steps for executing a workload specified via a task graph, according to various embodiments.
Figure 7B:
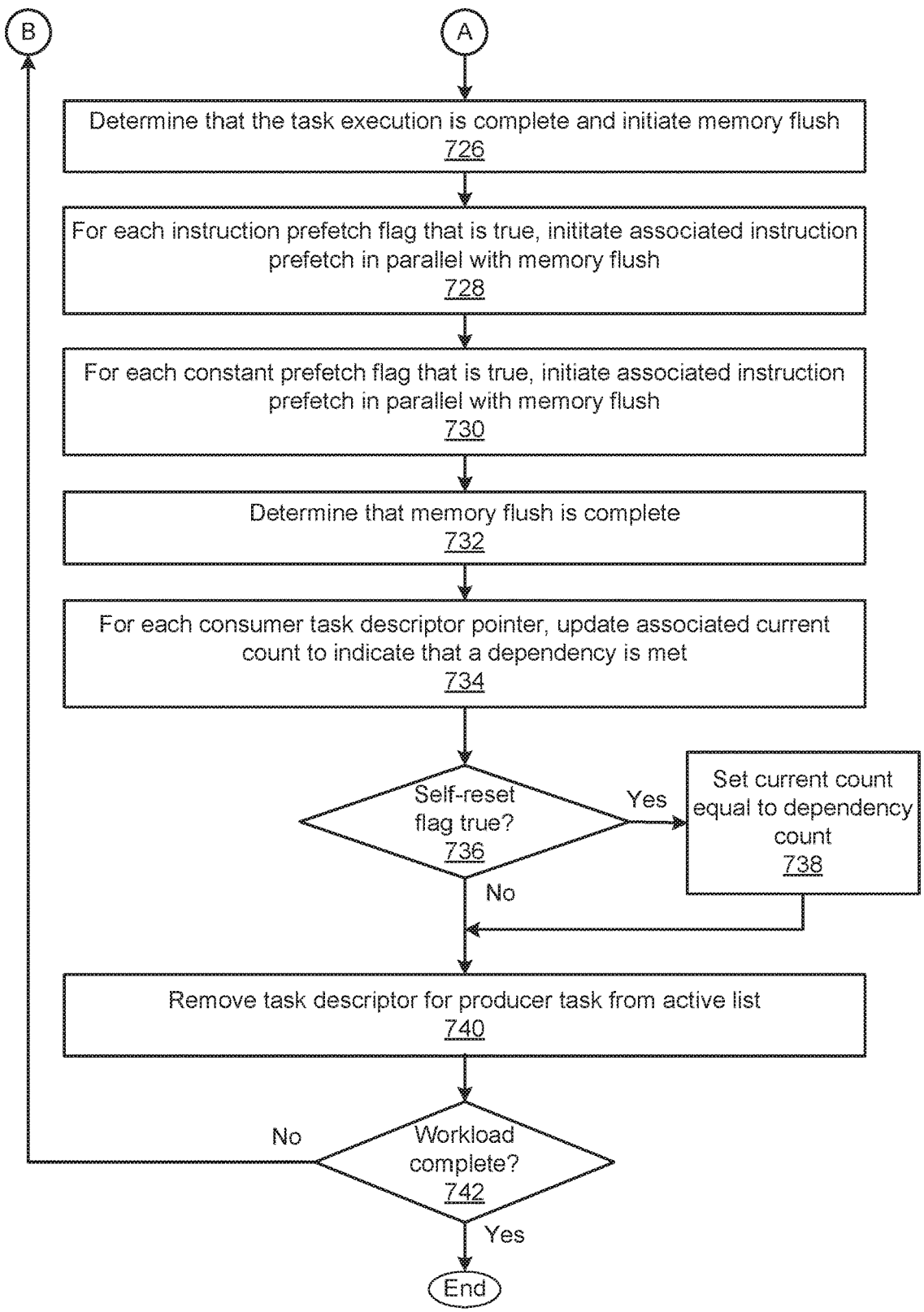

FIGS. 7A-7B set forth a flow diagram of method steps for executing a workload specified via a task graph, according to various embodiments. Although the method steps are described with reference to the systems of FIGS. 1-6, persons skilled in the art will understand that any system configured to implement the method steps, in any order, falls within the scope of the present disclosure.

As shown, a method 700 begins at step 702, where the dependency/prefetch unit 410 determines that the dependencies associated with the task descriptor 430(x) of a task X included in the task graph 128 have been met. The dependency/prefetch unit 410 may perform any number and type of operations to determine that the dependencies have been met. For instance, in some embodiments, the dependency/prefetch unit 410 determines whether the dependencies are met based on the current count 444(x). In the same or other embodiments, the dependency/prefetch unit 410 determines whether the dependencies are met based, at least in part, on a conditional branch/iteration condition.

At step 704, the dependency/prefetch unit 410 determines whether the task descriptor 430(x) is cached in the consumer task descriptor cache 480. If, at step 704, the dependency/prefetch unit 410 determines that the task descriptor 430(x) is cached in the consumer task descriptor cache 480, then the method 700 proceeds to step 706. At step 706, the dependency/prefetch unit 410 adds the cached task descriptor 430(x) to the active list 420. The method 700 then proceeds directly to step 710.

If, however, at step 704, the dependency/prefetch unit 410 determines that the task descriptor 430(x) is not cached in the consumer task descriptor cache 480, then the method 700 proceeds directly to step 708. At step 708, the dependency/prefetch unit 410 executes the task descriptor fetch 520 for task X and adds the resulting task descriptor 430(x) to the active list 420. The method 700 then proceeds to step 710.

At step 710, the scheduling/launch unit 490 initiates the task launch 530 for task X as per the task descriptor 430(x). At step 712, for each of the descriptor prefetch flags 462 included in the task descriptor 430(x) that is true, the dependency/prefetch unit 410 initiates the task descriptor prefetch 522 when the task launch 530 for task X is initiated. At step 714, the scheduling/launch unit 490 determines that the task launch 530 for task X is complete.

At step 716, the scheduling/launch unit 490 determines whether instructions for task X are cached. If, at step 716, the scheduling/launch unit 490 determines that instructions for task X are cached, then the method 700 proceeds directly to step 720. If, however, at step 716, the scheduling/launch unit 490 determines that instructions for task X are not cached, then the method 700 proceeds to step 718. At step 718, the scheduling/launch unit 490 executes the instruction fetch 540 for task X. The method 700 then proceeds to step 720.

At step 720, the scheduling/launch unit 490 determines whether constants for task X are cached. If, at step 720, the scheduling/launch unit 490 determines that constants for task X are cached, then the method 700 proceeds directly to step 724. If, however, at step 720, the scheduling/launch unit 490 determines that constants for task X are not cached, then the method 700 proceeds to step 722. At step 722, the scheduling/launch unit 490 executes the constant fetch 550 for task X. The method 700 then proceeds to step 724.

At step 724, the scheduling/launch unit 490 initiates the task execution 560 of task X. In various embodiments, any number of instruction fetches 540 and/or constant fetches 550 may occur as part of the task execution 560. In certain scenarios, performing instruction prefetch(es) 542 and/or constant prefetche(es) 552 in parallel with other task-related activities prior to the task execution 560 reduces the dependency resolution latency 510 and/or the execution time associated with the task execution 560.

At step 726, the scheduling/launch unit 490 determines that the task execution 560 of task X is complete and initiates the memory flush 510 for task X. At step 728, for each of the instruction prefetch flags 464 included in the task descriptor 430(x) that is true, the dependency/prefetch unit 410 initiates the instruction prefetch 542 for the associated consumer task in parallel with the memory flush 510 for task X. At step 730, for each of the constant prefetch flags 466 included in the task descriptor 430(x) that is true, the dependency/prefetch unit 410 initiates the constant prefetch 552 for the associated consumer task in parallel with the memory flush 510 for task X.

At step 732, the dependency/prefetch unit 410 determines that the memory flush 510 for task X is complete. At step 734, for each of the consumer task descriptor pointers 470 included in the task descriptor 430(x), the dependency/prefetch unit 410 updates the current count 444 to indicate that the dependency on task X is met.

At step 736, the dependency/prefetch unit 410 determines whether the self-reset flag 446 included in the task descriptor 430(x) is true. If, at step 736, the dependency/prefetch unit 410 determines that the self-reset flag 446 included in the task descriptor 430(x) is true, then the method 700 proceeds to step 738. At step 738, the dependency/prefetch unit 410 copies the dependency count 442 included in the task descriptor 430(x) to the current count 444 included in the task description 430(x). The method 700 then proceeds to step 740.

If, however, at step 736, the dependency/prefetch unit 410 determines that the self-reset flag 446 included in the task descriptor 430(x) is not true, then the method 700 proceeds directly to step 740.

At step 740, the dependency/prefetch unit 410 removes the task descriptor 430(x) associated with the producer task from the active list 420. At step 742, the dependency/prefetch unit 410 determines whether the workload specified via the task graph 128 is complete. If, at step 742, the dependency/prefetch unit 410 determines that the workload specified via the task graph 128 is not complete, then the method 700 returns to step 702, where the dependency/prefetch unit 410 determines that the dependencies associated with one of the task descriptors 430 are met.

The task management unit 234 continues to cycle through steps 702-742 until the task management unit 234 determines that the workload specified via the task graph 128 is complete. If, at step 742, the dependency/prefetch unit 410 determines that the workload specified via the task graph 128 is complete, then the method 700 terminates.

In sum, the disclosed techniques may be used to efficiently execute workloads specified via task graphs. The task graph includes any number of task descriptors, where each task descriptor specifies a different task. The task descriptor of a task X includes between zero and two consumer task descriptor pointers, where each consumer task descriptor pointer is a reference to the task descriptor of a consumer task that depends on task X. In some embodiments, a task management unit includes prefetch functionality that is automatically triggered for a consumer task by associated flags included in the task descriptor(s) of related producer task(s).

For example, for a consumer task Y of task X, the task descriptor of task X includes a descriptor prefetch flag, an instruction prefetch flag, and a constant prefetch flag that are associated with consumer task Y. A true value for the descriptor prefetch flag associated with consumer task Y triggers the task management unit to automatically prefetch the consumer task descriptor of consumer task Y when launching task X. The prefetched consumer task descriptor is stored in a task descriptor cache included in the task management unit. For additional control, software applications in some embodiments can issue a "task descriptor prefetch" command that causes the task management unit to prefetch the task descriptor for the specified task. A true value for the instruction flag associated with consumer task Y triggers the task management unit to automatically prefetch instructions for consumer task Y when the execution of task X completes. Similarly, a true value for the constant flag associated with consumer task Y triggers the task management unit to automatically prefetch instructions for consumer task Y when the execution of task X completes.

In the same or other embodiments, the task management unit includes self-reset functionality that is automatically triggered for a task by a self-reset flag included in the associated task descriptor. In addition to the self-reset flag, the task descriptor includes a dependency count that stores the total number of consumer tasks upon which the task is dependent and a current count that specifies the number of producer tasks that have not yet completed. A true value for the self-reset flag included in a task descriptor triggers the task management unit to automatically copy the dependency count to the current count when the memory flush for the associated task completes. The memory flush for a task occurs after the completion of the task execution of the task and ensures that the data that was produced by the task is accessible to all of the SMs. For additional control, software applications in some embodiments can issue a "decrement dependency" command for a specified task. The decrement dependency command causes the task management unit to decrement the current count included in the task descriptor for the specified task.

At least one technical advantage of the disclosed techniques relative to the prior art is that the task management unit can be configured to automatically reduce the overall time required to execute workloads specified via task graphs. When automatically triggered via associated flags, the descriptor prefetch, the instruction prefetch, and/or the constant prefetch for a consumer task occur in parallel to task-related activities for a related producer task. As a result, the dependency resolution latency between the completion of the execution of the producer task and the initiation of the consumer task is reduced. Further, if the self-reset functionality is enabled for a task included in a loop, then the task management unit automatically re-initializes the associated current count without any software intervention, thereby reducing the overall time required to execute the workload. Reducing dependency resolution latencies and/or the number of interactions between the PPU and the software decreases the overall time required to execute a workload. These technical advantages represent one or more technological advancements over prior art approaches.

1. In some embodiments, a computer-implemented method comprises determining that a first task is being launched and that a second task is dependent on the first task; prior to an execution of the first task, initiating a retrieval of a task descriptor associated with the second task from a memory; and launching the second task based on the task descriptor associated with the second task subsequent to at least the execution of the first task.

2. The method of clause 1, further comprising determining that a task descriptor associated with the first task specifies that a prefetch functionality is enabled for the second task.

3. The method of clauses 1 or 2, further comprising, prior to launching the second task, initiating a retrieval of one or more instructions associated with the second task from the memory.

4. The method of any of clauses 1-3, further comprising, prior to launching the second task, initiating a retrieval of one or more constants associated with the second task from the memory.

5. The method of any of clauses 1-4, further comprising, subsequent to at least the execution of the first task, re-initializing a dependency tracker associated with the first task to enable the first task to be re-executed.

6. The method of any of clauses 1-5, wherein re-initializing the dependency tracker comprises copying a total dependency count associated with the first task to a current count associated with the first task.

7. The method of any of clauses 1-6, wherein the first task is included in a loop of tasks, and further comprising subsequently updating the dependency tracker to indicate that a re-execution of a task upon which the first task depends has completed; and re-executing the first task.

8. The method of any of clauses 1-7, further comprising, prior to re-initializing the dependency tracker, determining that a first task descriptor associated with the first task specifies that re-initialization functionality is enabled for the first task.

9. The method of any of clauses 1-8, wherein launching the first task comprises performing one or more operations that prepare a plurality of streaming multiprocessors to execute the first task, and executing the first task comprises causing each streaming multiprocessor included in the plurality of streaming multiprocessors to execute one or more threads associated with the first task.

10. The method of any of clauses 1-9, wherein the first task and the second task are associated with a task graph.

11. In some embodiments, a system comprises a memory that stores one or more task descriptors; and a task management unit coupled to the memory that determines that a second task is dependent on a first task that is being launched; prior to an execution of the first task, initiates a retrieval of a task descriptor associated with the second task from the memory; and launches the second task based on the task descriptor associated with the second task subsequent to at least the execution of the first task.

12. The system of clause 11, wherein the task management unit determines that a task descriptor associated with the first task specifies that a prefetch functionality is enabled for the second task.

13. The system of clauses 11 or 12, wherein, prior to launching the second task, the task management unit initiates a retrieval of one or more instructions associated with the second task from the memory.

14. The system of any of clauses 11-13, wherein, prior to launching the second task, the task management unit initiates a retrieval of one or more constants associated with the second task from the memory.

15. The system of any of clauses 11-14, wherein, subsequent to at least the execution of the first task, the task management unit re-initializes a dependency tracker associated with the first task to enable the first task to be re-executed.

16. The system of any of clauses 11-15, wherein the task management unit determines that a task descriptor associated with the first task specifies that re-initialization functionality is enabled for the first task.

17. In some embodiments, a system comprises a memory storing a task graph; and a parallel processing unit coupled to the memory that determines that a first task is being launched and that a second task is dependent on the first task; prior to an execution of the first task, initiates a retrieval of a task descriptor associated with the second task from the memory; causes a plurality of streaming multiprocessors to execute the first task; and launches the second task based on the task descriptor associated with the second task subsequent to at least the execution of the first task.

18. The system of clause 17, wherein, prior to launching the second task, the parallel processing unit initiates a retrieval of one or more instructions associated with the second task from the memory.

19. The system of clauses 17 or 18, wherein, prior to launching the second task, the parallel processing unit initiates a retrieval of one or more constants associated with the second task from the memory.

20. The system of any of clauses 17-19, wherein, subsequent to at least the execution of the first task, the parallel processing unit re-initializes a dependency tracker associated with the first task to enable the first task to be re-executed.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
    determining that a first task is being launched and that a second task is dependent on the first task;
    determining that a task descriptor associated with the first task specifies that a prefetch functionality is enabled for the second task;
    prior to an execution of the first task, initiating a retrieval of a task descriptor associated with the second task from a memory; and
    launching the second task based on the task descriptor associated with the second task subsequent to at least the execution of the first task.

2. The method of claim 1, further comprising, prior to launching the second task, initiating a retrieval of one or more instructions associated with the second task from the memory.

3. The method of claim 1, further comprising, prior to launching the second task, initiating a retrieval of one or more constants associated with the second task from the memory.

4. The method of claim 1, further comprising, subsequent to at least the execution of the first task, re-initializing a dependency tracker associated with the first task to enable the first task to be re-executed.

5. The method of claim 4, wherein re-initializing the dependency tracker comprises copying a total dependency count associated with the first task to a current count associated with the first task.

6. The method of claim 4, wherein the first task is included in a loop of tasks, and further comprising:
    subsequently updating the dependency tracker to indicate that a re-execution of a task upon which the first task depends has completed; and
    re-executing the first task.

7. The method of claim 4, further comprising, prior to re-initializing the dependency tracker, determining that a first task descriptor associated with the first task specifies that re-initialization functionality is enabled for the first task.

8. The method of claim 1, wherein launching the first task comprises performing one or more operations that prepare a plurality of streaming multiprocessors to execute the first task, and executing the first task comprises causing each streaming multiprocessor included in the plurality of streaming multiprocessors to execute one or more threads associated with the first task.

9. The method of claim 1, wherein the first task and the second task are associated with a task graph.

10. A system comprising:
    a memory that stores one or more task descriptors; and
    circuitry coupled to the memory that:
        determines that a second task is dependent on a first task that is being launched;
        determines that a task descriptor associated with the first task specifies that a prefetch functionality is enabled for the second task;
        prior to an execution of the first task, initiates a retrieval of a task descriptor associated with the second task from the memory; and
        launches the second task based on the task descriptor associated with the second task subsequent to at least the execution of the first task.

11. The system of claim 10, wherein, prior to launching the second task, the circuitry initiates a retrieval of one or more instructions associated with the second task from the memory.

12. The system of claim 10, wherein, prior to launching the second task, the circuitry initiates a retrieval of one or more constants associated with the second task from the memory.

13. The system of claim 10, wherein, subsequent to at least the execution of the first task, the circuitry re-initializes a dependency tracker associated with the first task to enable the first task to be re-executed.

14. The system of claim 10, wherein the circuitry determines that the task descriptor associated with the first task specifies that re-initialization functionality is enabled for the first task.

15. A system comprising:
    a memory storing a task graph; and
    a processor coupled to the memory that:
        determines that a first task is being launched and that a second task is dependent on the first task;
        determines that a task descriptor associated with the first task specifies that a prefetch functionality is enabled for the second task;
        prior to an execution of the first task, initiates a retrieval of a task descriptor associated with the second task from the memory;
        executes the first task; and
        launches the second task based on the task descriptor associated with the second task subsequent to at least the execution of the first task.

16. The system of claim 15, wherein, prior to launching the second task, the processor initiates a retrieval of one or more instructions associated with the second task from the memory.

17. The system of claim 15, wherein, prior to launching the second task, the processor initiates a retrieval of one or more constants associated with the second task from the memory.

18. The system of claim 15, wherein, subsequent to at least the execution of the first task, the processor re-initializes a dependency tracker associated with the first task to enable the first task to be re-executed.

* * * * *